United States Patent
Stoll et al.

[11] Patent Number: 5,823,505
[45] Date of Patent: Oct. 20, 1998

[54] SOLENOID VALVE WITH AN ANCILLARY DRIVE MEMBER

[75] Inventors: Kurt Stoll, Esslingen; Jürgen Schnatterer, Wolfschlugen, both of Germany

[73] Assignee: Festo KG, Esslingen, Germany

[21] Appl. No.: 905,639

[22] Filed: Aug. 4, 1997

[30] Foreign Application Priority Data

Aug. 10, 1996 [DE] Germany ................ 196 32 379.7

[51] Int. Cl.⁶ .................................................. F16K 31/02
[52] U.S. Cl. .................. 251/129.07; 251/64; 137/529
[58] Field of Search .................. 251/129.07, 129.15, 251/64; 137/529

[56] References Cited

U.S. PATENT DOCUMENTS

| | | | |
|---|---|---|---|
| 3,538,954 | 11/1970 | Fagerlie et al. | 251/129.07 |
| 4,411,406 | 10/1983 | Inada et al. | 251/129.07 |
| 4,632,358 | 12/1986 | Orth et al. | 251/129.07 |
| 4,821,774 | 4/1989 | Chorkey | 251/129.07 |
| 5,503,184 | 4/1996 | Reinartz et al. | 251/129.07 |

FOREIGN PATENT DOCUMENTS

| | | |
|---|---|---|
| 1 390 295 A | 1/1965 | France . |
| 2 567 985 A | 1/1996 | France . |
| 1 031 073 B | 4/1953 | Germany . |
| AS 1 031 073 | 5/1958 | Germany . |
| AS 1 205 623 | 11/1965 | Germany . |
| 12 34 469 B | 2/1967 | Germany . |
| AS 1 234 469 | 2/1967 | Germany . |
| 35 00 802 A | 7/1986 | Germany . |
| 39 42 026 A | 7/1990 | Germany . |
| 705216 | 3/1954 | United Kingdom ........ 137/529 |
| 1 579 662 | 11/1980 | United Kingdom . |

Primary Examiner—Denise L. Ferensic
Assistant Examiner—John Ball
Attorney, Agent, or Firm—Hoffmann & Baron, LLP

[57] ABSTRACT

A solenoid valve, whose valve member is acted upon by a feed pressure in a closed setting by the feed pressure obtaining in an inlet duct. In order to render possible rapid switching operations a moving ancillary drive member is provided which is acted upon by a control pressure and which acts through an outlet duct in the opening direction, and hence against the feed pressure, on the valve member.

19 Claims, 3 Drawing Sheets

SOLENOID VALVE WITH AN ANCILLARY DRIVE MEMBER

BACKGROUND OF THE INVENTION

The invention relates to a solenoid valve comprising an inlet duct adapted to be connected with a source of pressure medium, an outlet duct adapted to be connected with a load, means defining a transfer opening arranged between the two ducts, and a valve member arranged opposite, on the inlet valve side, to the transfer opening, such valve member being able to be moved by an electromagnet, engaging a valve seat surrounding the transfer opening and being urged in the closing direction.

THE PRIOR ART

A solenoid valve of this type in the form of a ⅔ way valve is disclosed in the German patent publication 1,031,073 B. It possesses a main body having an inlet duct supplied with the feed pressure and an outlet duct leading to a load. On the said main body an electromagnet is arranged possessing a valve member biased by a return spring means into a closed position in which it engages a valve seat defining a transfer opening between the inlet duct and the outlet duct. In order to permit transfer of the fluid pressure medium out of the inlet duct into the outlet duct, by excitation of the electromagnet the valve member is changed over into an open position in which it is moved clear of the valve seat and in which the transfer opening is open.

For switching over into the open position it is normally necessary to supply a substantial amount of drive energy, because, owing to the pressure difference between the inlet valve and the outlet duct, the valve member is loaded additionally by the feed pressure on the inlet side toward the closed position. An attempt was made in the said German patent publication 1,031,073 B to solve this problem by the provision on the valve member of a moving valve or closing member, which is only moved clear of the valve seat, when the valve member has already moved through a part of its opening motion. However this design leads to a relatively elaborate form of the valve member, and furthermore in the case of a relatively large cross section of the transfer opening there is still a need for substantial drive energy in order to ensure rapid switching operations.

SHORT SUMMARY OF THE INVENTION

One object of the invention is to create a solenoid valve of the type initially mentioned which, while providing for large flow cross sections and accordingly high flow rates with a low drive energy requirement, renders possible short switching times.

In order to achieve these and/or other objects appearing from the present specification, claims and drawings, in the present invention a moving ancillary drive member is provided which is able to be acted upon by a control pressure and which is adapted to act on the valve member in the opening direction through the outlet duct.

It is in this manner that the fluid force leads to an ancillary drive action for the opening movement of the valve member. The valve member is subject to a force in the opening direction owing to the ancillary drive member, acted upon by a control pressure, so that the valve member experiences a setting force acting in the opening direction and which opposes the closing force caused by the feed pressure. The resulting fluid force, biasing the valve member in the closing direction, may accordingly be reduced as may be necessary so that the drive energy to be provided by the electromagnet for the opening motion is now low. Even if the cross section of the transfer opening is extremely large and accordingly the valve member is biased by a high closing force, produced by the feed pressure, into the closed position, it is possible for the oppositely acting ancillary drive member to cause an at least partial compensation of the fluid-related forces, something which renders possible short switching times or rapid movements of the valve member together with a low energy requirement. A transfer opening of correspondingly large dimensions renders possible a high flow rate, this being possible using a comparatively small electromagnet in the valve. Since the ancillary drive member acts through the drive duct on the valve member it is possible for the ancillary drive force resulting from the control pressure to be transferred to the valve member by way of the compensation duct, which is only subject to a minor pressure or may be even free of pressure. The outlet duct is practically completely shunted.

Further advantageous developments of the invention are defined in the claims.

It is an advantage if the control is able to be adjusted. This means that the resulting pressure forces acting on the valve member may be systematically adjusted and preset in accordance with the respective application.

It is most convenient for the control pressure to be equal to the feed pressure. This means that the control fluid responsible for the control pressure may be tapped from the inlet duct so that separate supply of fluid is unnecessary.

The ancillary drive member preferably possesses a moving drive portion, which is movingly received in a sealing fashion in a passage connecting the outlet duct with a control chamber subject to the control pressure. The drive portion may in this case constitute a moving section of the wall delimiting the outlet duct and is on the one hand subject to the control pressure and on the other hand to the outlet pressure obtaining in the outlet duct.

It is preferred for the drive portion to be constituted by a sliding piston, on which conveniently an actuating plunger extending toward the valve member is arranged, which plunger has a substantially smaller cross section than the outlet duct so that it only reduces the available flow cross section of the outlet duct to a slight extent. The ancillary drive member preferably acts through the transfer opening on the terminal region, covering the transfer opening in the closed position, of the valve member.

It would be feasible as well to provide a permanent connection between the ancillary drive member and the valve member so that both components always constitute a ganged unit of the structure. However it is substantially more advantageous to have a design, in the case of which the ancillary drive member only loosely rests against the valve member so that the valve member may come clear of the ancillary drive member in certain circumstances and is no longer subject to the action thereof. This is something which more particularly renders possible a design, in the case of which the maximum displacement of the setting member is limited to a fraction of the maximum switching displacement of the valve member. It is in this manner that there is an ancillary drive action for the opening movement of the valve member only at the start of its opening motion until the transfer opening is at least partially cleared and the valve member may be swept by the pressure medium, subject to the feed pressure, on the side facing the valve seat as well. Accordingly the closing force, caused by the feed pressure, is already considerably reduced and even a weak electromagnet is in a position to move the valve member entirely as far as the open position. The advantage of this arrangement is that during the following closing motion it is not immediately necessary for the ancillary drive member to be thrust back as well. Same is in fact firstly acted upon by the valve member, when the valve member already possesses a certain amount of kinetic energy so that the valve member may be securely switched over in the closed position with a simultaneous thrusting back of the ancillary drive member.

The closing operation may be speeded up even further if an accelerating spring means is provided for driving the valve member at the start of the closing motion, such spring means however only being tensioned during the last section of the opening movement of the valve member. It thus only acts during the initial phase of the opening movement in order to give the valve member a powerful moment of acceleration.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
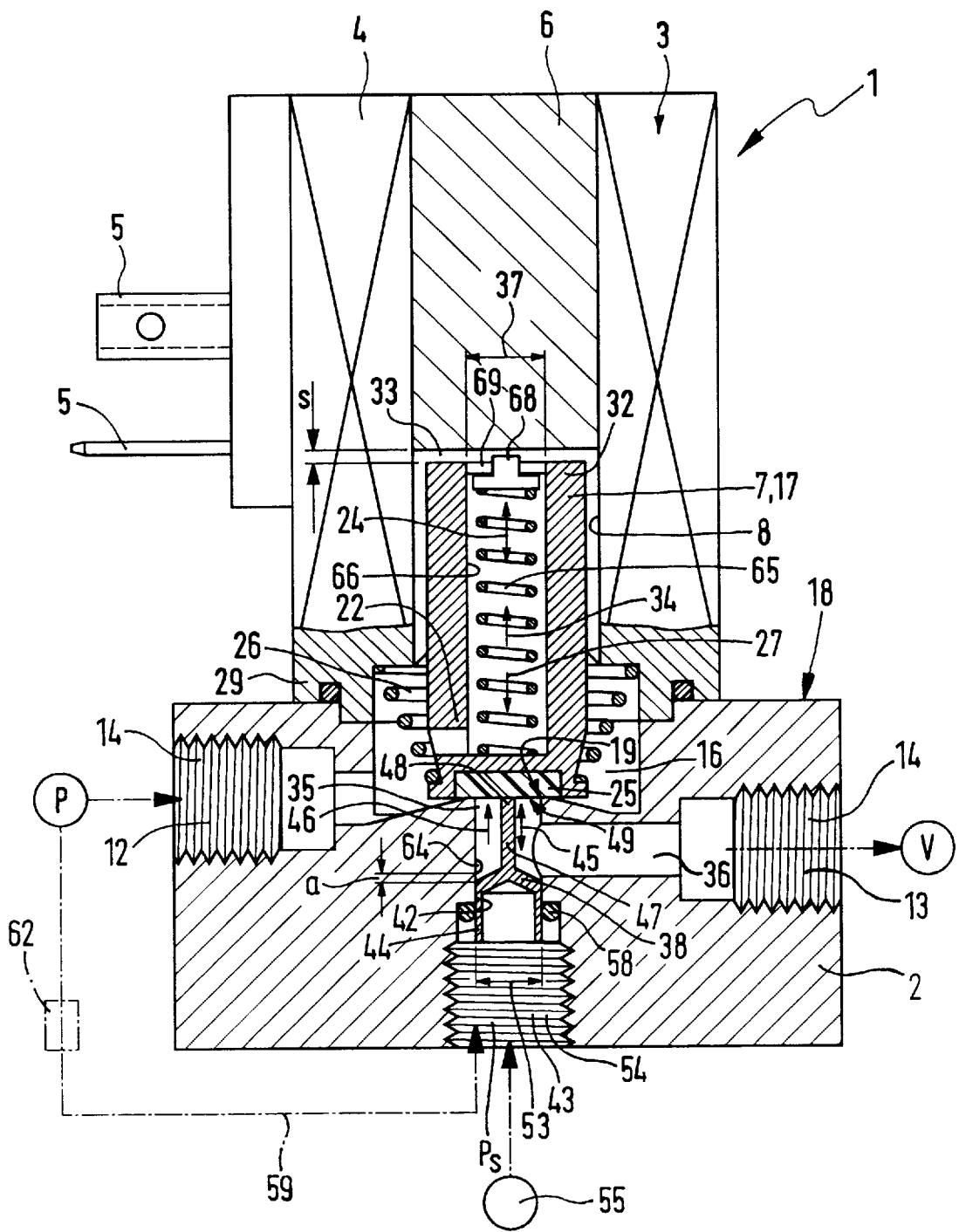
FIG. 1 shows a first design of the solenoid valve of the invention in the form of a 2/2 way valve in longitudinal section, the valve member having assumed its closed position.

The solenoid valves 1 illustrated in the drawings each comprise a main body 2, to which an electromagnet 3 is more particularly detachably secured. The electromagnet 3, which is only diagrammatically depicted, comprises at least one coil or winding 4, which is provided with terminal means 5, by way of which the electrical energy necessary for the operation of the electromagnet 3 is supplied. Inside the winding 4 a stationary armature 6 is arranged, and within the axial extension thereof, on the side facing the main body 2, a longitudinally moving armature 7 is arranged. The moving armature 7 has part of its length received in an armature receiving space 8 which adjoins the stationary armature 6 and is surrounded by the winding 4.

In the main body 2 an inlet duct 12 and an outlet duct 13 are formed. Each of these ducts 12 and 13 opens at a connection opening 14 at the outer side of the main body 2. The inlet duct 12 is able to be connected by way of the associated connection opening 14 with a source P of pressure medium, which supplies fluid pressure medium under pressure, more especially compressed air. The outlet duct 13 is able to be connected at its connection opening 14 with a load V to be operated by fluid force, such load being for example in the form of a fluid power drive cylinder.

The inlet duct 12 and the outlet duct 13 are connected together in the interior of the main body 2 by way of a transfer opening 15, which is able to be closed. On the side facing the inlet duct 12 the transfer opening is surrounded by an annular, unbroken valve seat 19, which is preferably a part of the main body 2.

The transfer opening 15 is directed into an intake chamber 16, which is constituted by a widened out part of the inlet duct 12. Into this intake chamber 16 there extends a valve member 17, which is for example constituted by the moving armature 7. When the electromagnet 3 is removed, the intake chamber 16 is open toward an outer mounting surface 18 on the base body 2, the electromagnet 3 being mounted on such mounting surface 18 so that the terminal section 22, projecting out of the armature receiving space 8, of the moving armature 7 or, respectively, of the valve member 17, extends into the intake chamber 16. The electromagnet 3 in this case at the same time constitutes a covering member for the intake chamber 16.

The intake chamber 16 preferably has a circular cross section, the transfer opening 15 being more particularly formed centrally in the floor 23, opposite to the electromagnet, of the intake chamber 16. Same also possesses the valve seat 19.

Figure 2:
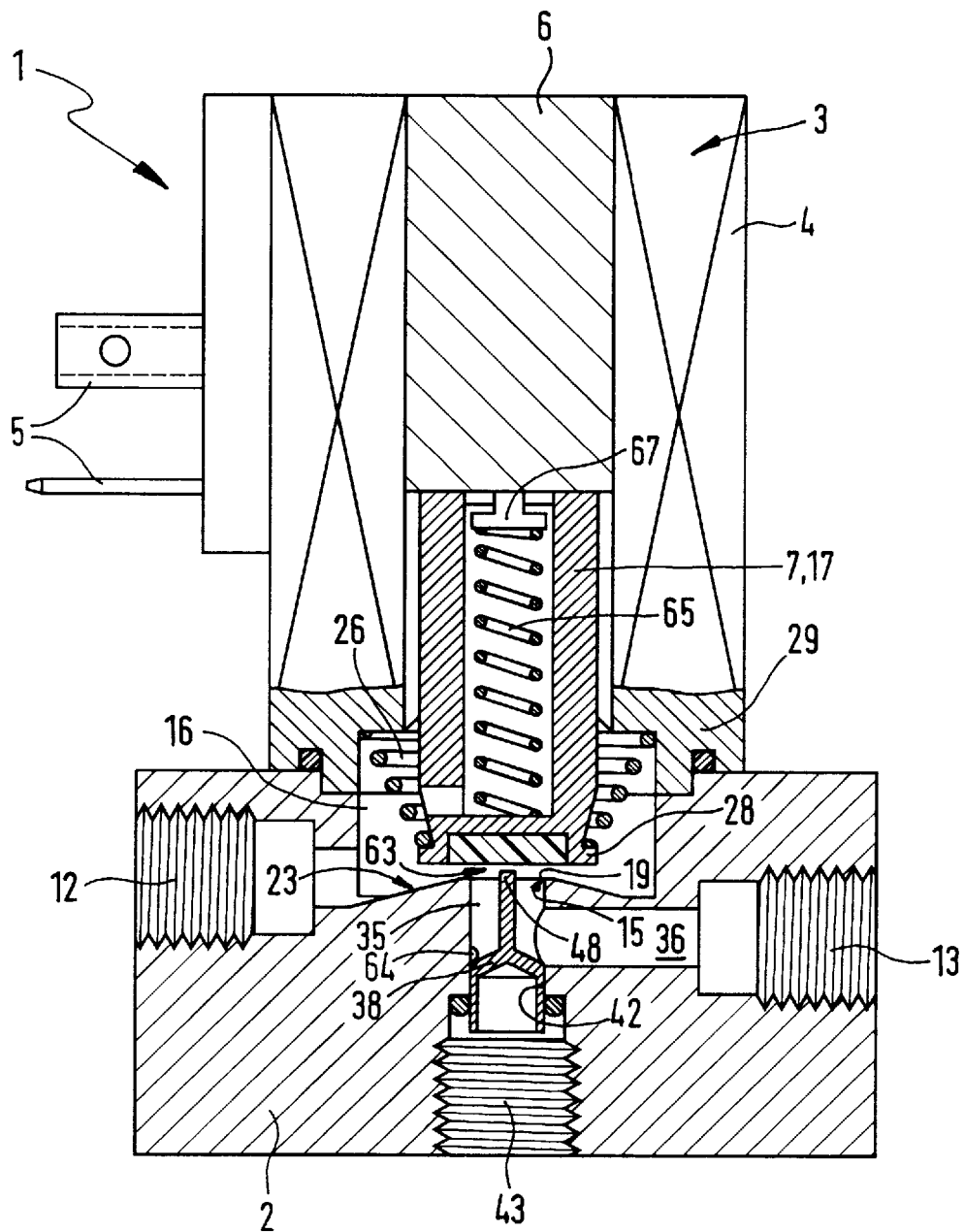
FIG. 2 shows the solenoid valve of FIG. 1 with the valve member shifted into the open position.

The valve member 17 may be switched over in a direction of linear motion, as indicated by the double arrow 24, between a closed position apparent in FIG. 1, and an open position as indicated in FIG. 2. This switching movement of the valve member 17 is preferably a linear reciprocating movement, the valve member 17 preferably possessing an essentially cylindrical configuration and its direction 24 of movement coinciding with the longitudinal axis thereof.

The valve member 17 is opposite to the transfer opening 15 and the valve seat 19 on the side of the inlet duct 12. In the closed position the valve member 17 has a closing portion 25 thereof resting on the terminal or end side of the projecting end section 22 in a sealing fashion on the valve seat 19. The solenoid valve 1 of the present example is accordingly a seat-type valve. The closing portion 25 is preferably an element consisting of a sealing material and more particularly of a rubber elastic material, and secured to the valve member 17.

A return spring means 26 urges the valve member 17 constantly in the closing direction 27. In the example it bears against a projection 28 on the valve member 17 and a housing part 29 of the electromagnet 3. It surrounds the valve member 17 coaxially. In the closed position there is an intermediate space 33 between the rear terminal section 32 of the valve member 17 and the stationary armature 6.

In the closed position the transfer opening 15 is closed so that no pressure medium may find its way from the inlet duct 12 into the outlet duct 13.

By excitation of the winding 4 of the electromagnet 3 the valve member 17 may be switched over into the open position as indicated in FIG. 2. The valve member 17 is attracted by the magnetic field and shifted in the opening direction 34 until it engages the stationary armature 6. The intermediate space 33 is closed in the open position. The width of the intermediate space 33 as measured in the direction of movement 24 accordingly defines the switching displacement s of the valve member 17 between the closed position and the open position.

On shifting the valve member 17 into the open position the return spring means 26 is compressed. It helps the valve member 17 to move back into the closed position, illustrated in FIG. 1, representing the initial position with the winding 4 turned off.

On the outlet side the transfer opening 15 is firstly adjoined by a first section 35 of the outlet duct 13, which extends coaxially to the transfer opening 15 and to the valve member 17. It accordingly extends in the direction 24 of movement of the valve member 17. This first duct section 35 is adjoined by a second section 36 of the outlet duct 13, which runs laterally so that the course of the outlet duct 13 has a bend. In the illustrated working embodiment of FIGS. 1 and 2 the second duct section extends at a right angle to the first duct section 35 so that the pressure medium flowing out through the outlet duct 13 experiences a relatively sharp change in direction. As compared with this in accordance with the embodiment of FIG. 3 the outlet duct 13 is more favorable for flow to the extent that the second duct section 36 is set at an obtuse angle to the first duct section 35.

Figure 3:
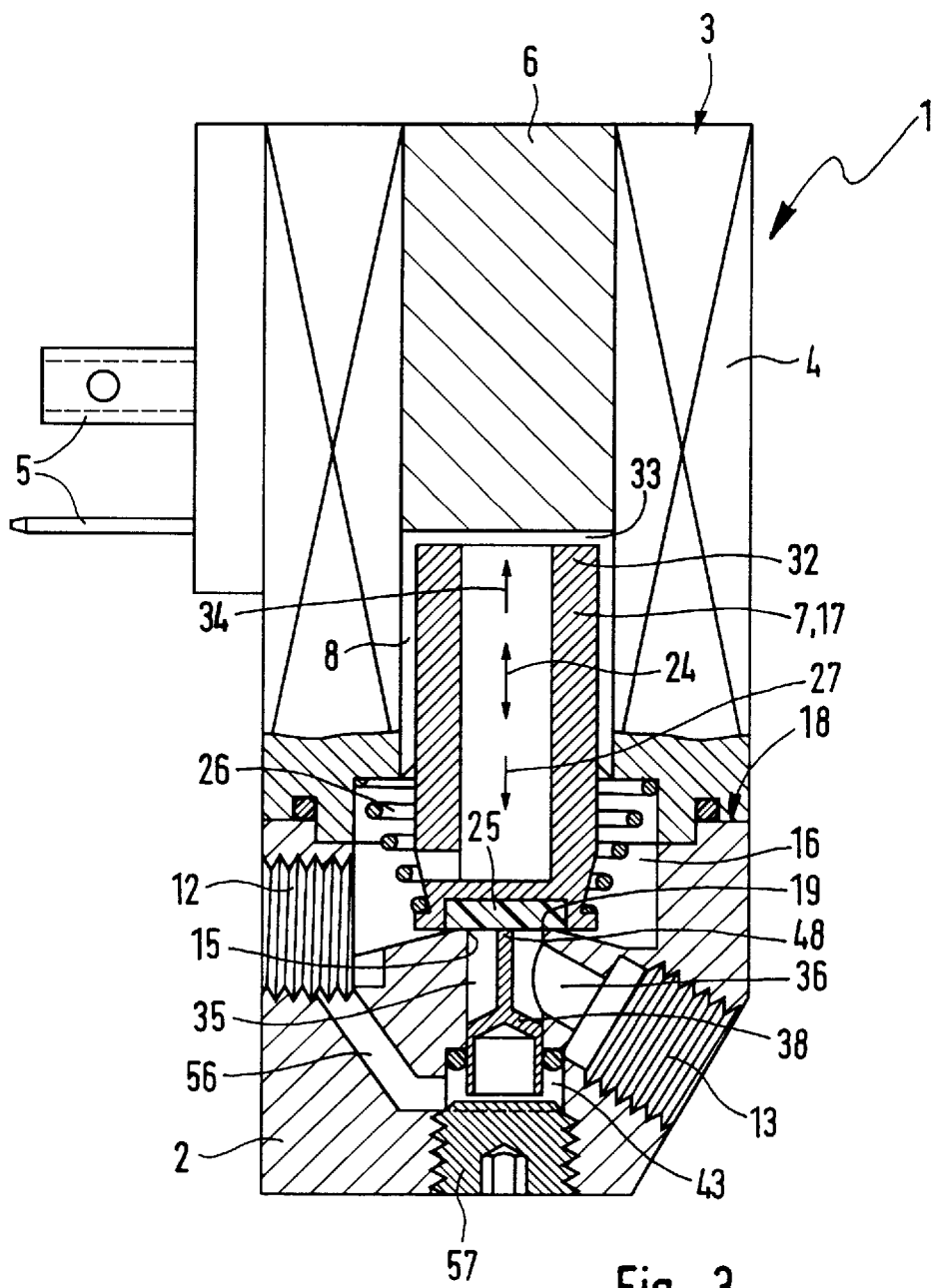
FIG. 3 shows an embodiment of the solenoid valve again in longitudinal section, with some modifications to depart from the design of FIGS. 1 and 2.

Moreover, it is to be pointed out that the present description, in the absence of any indication to the contrary, also applies for FIG. 3, in which components of like function have like reference numerals. FIG. 3 shows a design of the solenoid valve wherein the valve member 17 is located in the closed setting like the case in FIG. 1.

In the closed setting the valve member 17 is acted upon by the feed pressure on the inlet side, that is to say by the pressure obtaining in the inlet duct 12, urging it in the closing direction. As regards the resulting closing force effective in the closing direction 27 however only a section 37 of the area is relevant which faces in the opening direction 34, such area being the same as the cross sectional area of the transfer opening 15. In other respects the valve member 17 is pressure-compensated. The resulting closing force is due to the pressure difference as related to the said areas.

It is particularly when large transfer cross sections are required and/or when there is a high pressure on the inlet side, that there is a need for to switch magnetic force in order to switch over the valve member 17 into the open setting. In order to deal with this problem, in the case of the solenoid valve 1 described herein, there is in addition to the valve member 17 a moving ancillary drive member 38 acted upon by a control pressure $p_S$, and able to act through the outlet duct 13 in the opening direction 34 on the valve member 17. The ancillary drive member 38 consequently applies a force, effective in the opening direction 34, on the valve member 17 and accordingly aids or supports the action of the electromagnet. The ancillary drive force of the ancillary drive member 38 counteracts the closing force of the feed pressure so that the resulting closing force, to the attributed to the pressure medium, may be minimized and the electromagnet now requires less power in order to move the valve member 17 extremely rapidly into the open setting. Accordingly the invention provides a high speed switching valve, which renders possible extremely short switching times with a low actuating energy requirement even in the case of large cross sections and accompanying high flow rates.

As regards details in the embodiments of the invention the arrangement is such that as an extension of the first section 35 of the outlet duct 13 a passage 42 is provided, which connects the outlet duct 13 with a control chamber 43, which may be put under the control pressure $P_S$. The ancillary drive member 38 possesses a drive portion 44, for example a diaphragm or, as illustrated, a piston, which is arranged in the passage 43 in a sealing manner and may be shifted in the shift direction 45 as indicated by a double arrow. From the side of the outlet duct 13 the drive portion 44 is accordingly subject to the pressure obtaining in the outlet duct 13 and in the opposite direction is subject to the control pressure $P_S$ obtaining in the control chamber 43. Since the control pressure $P_S$ is, at least in the closed setting of the valve member 17, substantially larger than the pressure in the outlet duct 13, the result is an ancillary drive force 46, by which the ancillary drive member 38 is thrust toward the valve member 13.

On the side, facing the outlet duct 13, of the drive portion 44 the ancillary drive member 38 possesses an actuating plunger 47, which projects in the longitudinal direction of the first duct section 35 toward the transfer opening 15 and in the working embodiment of FIG. 1 has its free end 48 in abutment with the portion 49, covering the transfer opening 15, of the valve member 17. In this respect it is preferred, in accordance with FIGS. 1 and 2, to have a loose contact, that is to just a touching and not a firm engagement. Unlike this in the case of the working embodiment of FIG. 3, there is a firm connection provided between the ancillary drive member 38 and the valve member 17, since, as is convenient, the actuating plunger 47 has its free end 48 fixed in some suitable fashion on the covering portion 49. The ancillary drive member 38 might in this case even be an integral part of the valve member 17.

In the case of the working embodiments there is a provision such that the control pressure $P_S$ obtaining in the control chamber 43 is the same as the feed pressure on the inlet side. In connection with the further measure also adopted in the working embodiment, in accordance with which the control surface 53, which is subject to the control pressure $P_S$ and faces the control chamber 43, has a cross sectional area at least approximately equal to the cross section of the transfer opening 17, this means that the closing force exerted by the feed pressure on the valve member 17 is practically completely canceled out. The designer therefore now has to set the drive energy necessary for the operation of the solenoid valve essentially on the basis of setting force of the spring means 26, which however may be designed to be relatively weak. As a rule it suffices to ensure that the valve member is free of vibrations.

In the illustrated working embodiment of FIGS. 1 and 2 the control pressure $p_S$ is supplied separately to the control chamber 43. Consequently the control chamber 43 possesses a connection opening 54, by way of which a connection may be produced with a further source 55 of pressure medium supplying the control pressure $p_S$. This source preferably also renders possible a change in the setting of the control pressure $p_S$ in order to produce an effect on the ancillary drive force and to variably preset the desired resulting closing force of the valve member 17 in accordance with requirements.

As an alternative to having a further source 55 of pressure medium it is possible, for reducing the constructional complexity, for the control chamber 43 to be also connected with the pressure medium source P supplying the feed pressure. A corresponding design will appear from FIG. 3, wherein the control fluid responsible for the control pressure is tapped from the inlet duct 12. In this case a control duct 56 is formed inside the main body 2 connecting the outlet duct 12 with the control chamber 43. Reference numeral 57 in FIG. 3 denotes a closure plug, which fluid-tightly shuts off the control chamber 43 and renders possible the fitting of the ancillary drive member 38 and furthermore of a sealing means 58 between the main body 2 and the ancillary drive member 38.

The latter is designed in the form of ring and in the working embodiment of FIGS. 1 and 2 may be fitted through the connection opening 54.

Instead of a control duct 56 integrated in the main body 2 it is also possible to provide an external pressure medium line 59 as indicated in chained lines in FIG. 1 in order to connect the control chamber 43 with the common pressure medium source P. Both on the pressure medium line 59 and also on the control duct 56 it is possible for a pressure setting means 62 to be arranged, which is illustrated only diagrammatically in FIG. 1, and which renders possible a presetting of the control pressure $p_S$ as may be required.

It is preferred for the control pressure $p_S$ to be continuously present in the control chamber 43. Therefore the ancillary drive force 46 is available without delay on opening of the solenoid valve 1. During movement of the valve member 17 in the opening direction 34 as opening is taking place, it is additionally thrust by the ancillary drive member 38. Accordingly the ancillary drive member 38 moves through the transfer opening 15 a short distance into the intake chamber 16. The arrangement is however so designed that the outlet duct 13 is not blocked by the ancillary drive member 38, since more particularly the drive portion 44 is so designed that, when the valve member 17 is open, it does not extend, or only does so a small distance, from the passage 42 into the outlet duct 13. The operating plunger 47, which in the illustrated working embodiment is centrally arranged, is made very much thinner than the flow cross section of the outlet duct 13.

In the closed setting of the valve member 17 the ancillary drive member 38 assumes the basic position illustrated in FIGS. 1 and 3. In the illustrated working embodiment of the invention of FIGS. 1 and 2 measures are adopted by which the maximum displacement a, as measured from the basic position, of the ancillary drive member 38 is made smaller than the switching stroke s of the valve member 17. The consequence thereof is that it is only at the start of the opening motion of the valve member 17 that the ancillary drive member 38 acts on the valve member. The valve member 17 performs the rest of its stroke as far as the open setting by itself and without being acted upon by the ancillary drive member 38. Consequently an intermediate space 63 will remain in the open setting of the valve member 17 between the same and the associated free end 48 of the ancillary drive member 38.

The de-coupling, present in the open setting, between the valve member and the ancillary drive member 38 means that during the following closing motion the valve member 17 is firstly able to be moved without any effect on it of the ancillary drive member 38 in the closing direction 27. It is only when after a short displacement the intermediate space 63 is closed that the valve member 17 acts on the ancillary drive member 38 and thrusts same against the control pressure $p_S$ back into the basic setting. The thrusting back action is facilitated because the valve member accumulates kinetic energy until it strikes against the ancillary drive member 38 so that the ancillary drive member 38 is moved back into the basic setting briskly.

In the illustrated working embodiment of the invention in accordance with FIGS. 1 and 2 there is a displacement distance of the ancillary drive member 38 which is smaller than is the case with the valve member, since at least one abutment 64 is placed in the path of movement of the ancillary drive member 38 and more particularly of the drive portion 44. This abutment 64 projects for example into the passage 42 and/or into the first duct section 35. Since in the illustrated working embodiment of FIG. 3 there is no division up between the valve member 17 and the ancillary drive member 38, the two parts remain together until the open setting is reached. For switching over into the closed setting it is hence necessary to provide a somewhat greater force than in the working embodiment of FIGS. 1 and 2. No abutment is provided here.

In order to produce not only a rapid opening motion but also a rapid closing one, an acceleration spring means 65 may be provided for driving the valve member 17 at the start of the closing movement, such means 65 only being tensioned during the last section of the opening movement of the valve member 17. There is such a provision in the working embodiment of FIGS. 1 and 2.

As illustrated in FIGS. 1 and 2 the valve member 17 has a receiving space 66 which is open toward the terminal surface of the rear terminal section 32. The acceleration spring means 65, for example in the form of a helical compression spring, is arranged in this receiving means 66, such means 65 acting on an ancillary drive member 67 so that same has a support portion 68 thereof projecting past the terminal surface of the valve member 17. An abutment 69 sets this position of the ancillary drive member. On approaching the open position the support portion 68 gets into contact with the facing end surface of the stationary armature 6 and is thrust back into the receiving space 66 with a simultaneous compression of the acceleration spring means 65 until the valve member 17 as a whole engages the stationary armature 6.

If then the winding 4 is turned off or the current in it reversed, the acceleration spring means 65 will expand suddenly, the valve member 17 being repelled in the closing direction away from the stationary armature. The kinetic energy then received furthermore enhances the return motion of the ancillary drive member 38 into the basic position.

In the case of the solenoid valve 1 of the present example it is a question of a 2/2 way valve. However, it would be as well to apply the principle of the invention to other types of valves.

We claim:
1. A solenoid valve comprising:
an inlet duct configured to be connected with a source of pressure medium, an outlet duct configured to be connected with a load, a transfer opening arranged between the two ducts, a valve member arranged opposite to the transfer opening, the valve member being able to be moved by an electromagnet in an opening direction, the valve member engaging a valve seat surrounding the transfer opening and being urged toward a closing direction, and a moving ancillary drive member abutting the valve member in a closed setting which is able to be acted upon by a control pressure and is configured to act on the valve member in the opening direction through the outlet duct, and wherein the maximum displacement path of the ancillary drive member as measured in the direction of motion of the valve member, starting from a basic setting therefor where the drive member abuts the valve member in the closed setting, is smaller than the switching stroke of the valve member between the closed setting and the opening setting.

2. The solenoid valve as set forth in claim 1, comprising means for adjustment of said control pressure.

3. The solenoid valve as set forth in claim 1, wherein said control pressure is the same as said feed pressure.

4. The solenoid valve as set forth in claim 1, comprising means for tapping a control fluid from the inlet duct, said control fluid being responsible for providing the control pressure.

5. The solenoid valve as set forth in claim 1, wherein said ancillary drive member configured to be acted upon by the control pressure has a size at least approximately equal to the cross sectional area of the said transfer opening.

6. The solenoid valve as set forth in claim 1, wherein said ancillary drive member possesses a drive portion arranged in a sealing fashion movingly in a passage connecting the outlet duct with a chamber subject to the control pressure.

7. The solenoid valve as set forth in claim 6, wherein said drive portion is constituted by a piston placed for sliding motion in the passage.

8. The solenoid valve as set forth in claim 6, comprising an actuating plunger arranged on the drive portion, said actuating plunger projecting toward the valve member and being configured to cooperate with the valve member.

9. The solenoid valve as set forth in claim 6, comprising a control duct in the basic body, said control duct connecting the control chamber with the inlet duct.

10. The solenoid valve as set forth in claim 1, wherein said ancillary drive member is configured to act through the transfer opening on the portion of the valve member, said portion covering the transfer opening in the closed setting.

11. The solenoid valve as set forth in claim 1, wherein the ancillary drive member is firmly connected with the valve member.

12. The solenoid valve as set forth in claim 1, wherein the displacement path of the ancillary drive member is limited by at least one abutment.

13. The solenoid valve as set forth in claim 1, comprising a return spring means for constantly urging the valve member in the closing direction.

14. The solenoid valve as set forth in claim 1, comprising an acceleration spring means for driving the valve member at the beginning of the closing motion, such spring means only being compressed during the end phase of an opening movement of the valve member.

15. The solenoid valve as set forth in claim 1, wherein the outlet duct, following the transfer opening, possesses a first duct section extending in the direction of motion of the valve member, such duct section merging into a laterally projecting second duct section, the ancillary drive member extending in the first duct section and being arranged in a moving fashion in a passage placed opposite to the transfer opening.

16. The solenoid valve as set forth in claim 1, wherein said solenoid valve is a 2/2 way valve.

17. The solenoid valve as set forth in claim 1, wherein the valve member is constituted by the moving armature of the electromagnet.

18. A solenoid valve comprising:

an inlet duct configured to be connected to a source of pressure medium, an outlet duct configured to be connected to a load, and a transfer opening arranged between the two ducts;

a valve member arranged opposed from the transfer opening, the valve member being movable in an opening direction by an electromagnet, and engaging a valve seat surrounding the transfer opening and being urged in the closing direction, a translatable ancillary drive member actuatable by a control pressure and which is configured to act on the valve member in the opening direction through the outlet duct;

and an acceleration spring means for driving the valve member toward the closed position at the beginning of a closing motion, the spring means only being compressed during the end phase of an opening movement of the valve member.

19. A solenoid valve comprising:

an inlet duct configured to be connected to a source of pressure medium, an outlet duct configured to be connected to a load, and a transfer opening arranged between the two ducts;

a valve member arranged opposed from the transfer opening, the valve member being movable in an opening direction by an electromagnet and engaging a valve seat surrounding the transfer opening and being urged toward a closing direction; and a moving ancillary drive member actuatable by a control pressure acting through a control pressure duct, the drive member being configured to act upon the valve member in the opening direction through the outlet duct, the inlet duct being separate and substantially isolated from the control pressure duct thereby permitting the ancillary drive member to be controlled independent of the pressure medium of the inlet duct.

* * * * *

UNITED STATES PATENT AND TRADEMARK OFFICE
CERTIFICATE OF CORRECTION

PATENT NO. : 5,823,505
DATED : October 20, 1998
INVENTOR(S) : Stoll, et al.

It is certified that error appears in the above-indentified patent and that said Letters Patent is hereby corrected as shown below:

Column 5, Line 30      now reads "for to switch magnetic force", should read --for a strong magnetic force--.

Column 6, Line 19      now reads "same as the teed pressure", should read --same as the feed pressure--.

Signed and Sealed this

Sixteenth Day of March, 1999

*Attest:*

Q. TODD DICKINSON

*Attesting Officer*      *Acting Commissioner of Patents and Trademarks*